(12) United States Patent
He et al.

(10) Patent No.: US 10,422,717 B2
(45) Date of Patent: Sep. 24, 2019

(54) THREE-DIMENSIONAL STANDARD VIBRATOR BASED ON AEROSTATIC GAS-FLOATING DECOUPLING DEVICE

(71) Applicant: ZHEJIANG UNIVERSITY, Zhejiang (CN)

(72) Inventors: Wen He, Zhejiang (CN); Xufei Zhang, Zhejiang (CN); ShuShi Jia, Zhejiang (CN); Jie Zhou, Zhejiang (CN)

(73) Assignee: Zhejiang University, Hangzhou (CN)

( * ) Notice: Subject to any disclaimer, the term of this patent is extended or adjusted under 35 U.S.C. 154(b) by 101 days.

(21) Appl. No.: 15/535,059

(22) PCT Filed: Aug. 18, 2015

(86) PCT No.: PCT/CN2015/087342
§ 371 (c)(1),
(2) Date: Jun. 11, 2017

(87) PCT Pub. No.: WO2016/112685
PCT Pub. Date: Jul. 21, 2016

(65) Prior Publication Data
US 2017/0350787 A1   Dec. 7, 2017

(30) Foreign Application Priority Data
Jan. 15, 2015   (CN) .......................... 2015 1 0018711

(51) Int. Cl.
*G01M 7/06* (2006.01)
(52) U.S. Cl.
CPC ..................... *G01M 7/06* (2013.01)
(58) Field of Classification Search
CPC ...................................................... G01M 7/06
(Continued)

(56) References Cited

U.S. PATENT DOCUMENTS

2003/0200811 A1* 10/2003 Woyski .................. G01M 7/02
73/663

FOREIGN PATENT DOCUMENTS

CN          102364316 A      2/2012

\* cited by examiner

*Primary Examiner* — Tarun Sinha
(74) *Attorney, Agent, or Firm* — Lathrop Gage LLP

(57) ABSTRACT

The three-dimensional standard vibrator based on the aerostatic gas-floating decoupling device contains a base. The base is installed with a X axis vibrator, a X axis return mechanism, a Y axis vibrator, a Y axis return mechanism, a Z axis vibrator, and a three-dimensional vibration platform. The X axis vibrator and the X axis return mechanism are both installed along X axis but separated by the three-dimensional vibration platform. The Y axis vibrator and the Y axis return mechanism are both installed along Y axis but also separated by the three-dimensional vibration platform. There are two aerostatic gas-floating plates corresponding to the vibrator and connecting to the X axis and Y axis vibrators, respectively. Two intervals used to generate gas films are formed between the two aerostatic gas-floating plates and the three-dimensional vibrator, respectively. The X axis and Y axis return mechanisms both consist of a reset spring and an aerostatic gas-floating plate corresponding to the spring. The Z axis vibrator is connected with the Z axis aerostatic gas-floating decoupling device. There are intervals used to form gas films between the Z axis aerostatic gas-floating decoupling device and the three-dimensional vibration platform. The present invention contains the advantages of high loading capacity, supporting stability and uniformity.

5 Claims, 2 Drawing Sheets

(58) Field of Classification Search
USPC .......................................................... 73/665
See application file for complete search history.

(a)   (b)

THREE-DIMENSIONAL STANDARD VIBRATOR BASED ON AEROSTATIC GAS-FLOATING DECOUPLING DEVICE

CROSS REFERENCE TO RELATED APPLICATIONS

This application is a national stage under 35 U.S.C. § 371 of PCT International Application PCT/CN2015/087342, filed Aug. 18, 2015, which claims priority to Chinese patent application 2015100187116, filed Jan. 1, 2015.

FIELD OF THE INVENTION

This present invention relates to a three-dimensional standard vibrator based on an aerostatic gas-floating decoupling device.

BACKGROUND OF THE INVENTION

Recently, the calibration of three-dimensional vibration sensor is usually based on a single dimension vibration calibration system, which calibrates the three axes of the sensor one after another. Inevitably, this method consumes too much time and complicates the data processing system. In the meantime, considering the cross-axis coupling of the three-dimensional sensor, it is hard to obtain the sensitivity matrix, which describes the coupling relations between the three axes of the sensor based on this method. So, development of a three-dimensional standard vibrator, which could output vibration signals to excite the three axes of the three-dimensional sensor synchronously, has important theoretical and practical significance on the development of the calibration technology for vibration sensor and the progress of the related industry technology.

The Chinese patent CN 102364316 B announces a three-dimensional standard vibrator based on a latch-type decoupling device. The vibrator consists of a base, three single-dimensional electromagnetic vibrators along X, Y, and Z axis (X and Y axes represent the two horizontal directions perpendicular to each other and Z axis represents the vertical direction) and a three-dimensional vibration platform. Each of the single-dimensional vibrators is connected with the three-dimensional vibration platform through a motion decoupling device. The motion decoupling device consists of the first framework and the second framework, which are intersected with each other. The two frameworks are all comprised of the outer frame, the inner frame, the first and second lateral frames between the outer and inner frames. The outer frame is opposite to the inner frame, and the inner frame from one of the frameworks is inserted into the other framework. The inner frame of the first framework is drilled with gas channels and vent holes. The two ends of all the vent holes are connected with the gas channels and the outside atmospheres, respectively. The second framework is installed with its inner and outer frames both have little intervals to the inner frame of the first framework, and the intervals could form the aerostatic guide rails for the inner frame of the first framework. There is a gap between the inner frame of the second framework and the outer frame of the first framework to avoid interfering of the two frameworks. The gas channels are connected with the outside pressured gas sources. The two outer frames of the first framework and the second framework are connected with the electromagnetic vibrator and the three-dimensional vibration platform, respectively. The latch-type structures and the technique of aerostatic gas-floating are utilized in the vibrator to realize force transmissions and motion decoupling for the three-dimensional vibrations.

The shortcomings of the proposed vibrator are as follows. 1) The required accuracy of the assembling is excessively high since the first and second frameworks are mounted on the vibrator and the three-dimensional vibration platform respectively and the two frameworks are inserted with each other with latch-type structure. Besides, the area of the gas film is restricted when it is formed in the interval between the first and second frameworks, and the second framework increases the mass of the three-dimensional vibration platform. 2) Since the latch-type structure pulls the three-dimensional vibration platform when the vibrator vibrates back and forth, it is prone to generate structural deformations and bring great loads for the vibrator. 3) Conventionally, an air cavity is designed to improve the orifice restricted bearings' loading capacity. However, the existence of the air cavity will inevitably generate "pneumatic hammer" phenomenon in a specified frequency range and reduce the loading stability and upper limit of working frequency for the aerostatic gas-floating system. In addition, restricted by the orifice size and machining accuracy, it is difficult to guarantee the uniformity of the loading capacity among each of the orifices. The non-uniform loading will make the three-dimensional vibration platform tilt or rotate, and do harm to the motion decoupling of the three-dimensional standard vibrator.

SUMMARY OF THE INVENTION

To overcome the shortcomings of the prior art, the present invention provides a three-dimensional vibrator based on aerostatic gas-floating decoupling device, which can provide high loading capacity, supporting stability and uniformity.

The three-dimensional standard vibrator based on the aerostatic gas-floating decoupling device contains a base. The base is installed with three single-dimensional vibrators (along X, Y and Z axes, respectively), two return mechanisms (along X and Y axes) and a three-dimensional vibration platform.

The properties of the three-dimensional standard vibrator are as follows. The X axis vibrator and the X axis return mechanism are both installed along X axis but separated by the three-dimensional vibration platform. The Y axis vibrator and the Y axis return mechanism are both installed along Y axis but also separated by the three-dimensional vibration platform.

There are two aerostatic gas-floating plates corresponding to the vibrator and connecting to the X axis and Y axis vibrators, respectively. Two intervals used to generate gas films are formed between the two aerostatic gas-floating plates and the three-dimensional vibration platform, respectively.

The X axis and Y axis return mechanisms both consist of a reset spring and an aerostatic gas-floating plate corresponding to the spring. The reset springs are connected with the aerostatic gas-floating plates corresponding to the spring. The Z axis vibrator is connected with the Z axis aerostatic gas-floating decoupling device. There are intervals used to generate gas films in the Z axis aerostatic gas-floating decoupling device.

In addition, the aerostatic gas-floating plates corresponding to the spring and the vibrator are installed symmetrically on both sides of the three-dimensional vibration platform.

The vibration along X axis is implemented by the X axis vibrator and the X axis return mechanism; The vibration along Y axis is implemented by the Y axis vibrator and the Y axis return mechanism; The vibration along Z axis is implemented by the Z axis vibrator.

Take the X axis vibration of the three-dimensional vibrator implemented by the X axis vibrator and the X axis return mechanism as an example, the X axis vibrator and the gas film between the three-dimensional vibration platform and the X axis vibrator together push the three-dimensional vibration platform move towards the X axis return mechanism, then, the corresponding return spring is compressed. When the X axis vibrator moves back, the three-dimensional vibration platform is pushed back by the X axis return mechanism. The action mode for the vibration of the three-dimensional vibration platform along Y axis is the same with that along X axis.

The X axis reset spring and Y axis reset spring are both air springs.

In addition, the aerostatic gas-floating plates corresponding to the spring and the vibrator are all comprised of a base plate and some porous restrictors. The porous restrictors are fixed on the base plate. There are gas flow channels in the base plate leading to the porous restrictors. High pressure gas flows through the gas flow channels and the porous restrictors, and then forms an uniform gas film between the aerostatic gas-floating plate and the three-dimensional vibration platform.

In addition, there are several porous restrictors installed uniformly in the base plate.

The aerostatic gas-floating plates corresponding to the vibrator and the spring along X axis together constitute the X axis gas-floating decoupling device. In the same way, the aerostatic gas-floating plates corresponding to the vibrator and the spring along Y axis together constitute the Y axis gas-floating decoupling device.

In addition, the Z axis gas-floating decoupling device consists of a first connecting plate, a second connecting plate, some adjusting plates and a Z axis aerostatic gas-floating plate. The adjusting plate is installed rigidly between the first and the second connecting plate, and then these three components constitute a gas cavity, where the Z axis aerostatic gas-floating plate is installed. There are notches machined in the second connecting plate and used for the connecting of the three-dimensional vibration platform with the Z axis aerostatic gas-floating plate. The first and second connecting plates are all machined with gas flow channels and fixed with porous restrictors, and the gas flow channels lead to the porous restrictors for each of the connecting plates.

The proposed three-dimensional vibration platform is installed with corner connecting posts and the second connecting plate is machined with rectangular notches. Because of those two kinds of structures, the three-dimensional vibration platform could be connected with the second connecting plate and keeps a gap from the first connecting plate. At the same time, there are gaps between the Z axis aerostatic gas-floating plate and the adjusting plates, too. All the gaps together are used to realize the freely vibrations of the three-dimensional vibration platform along the X and Y axes.

The proposed X, Y, Z axis gas-floating decoupling devices together constitute the porous-based aerostatic gas-floating decoupling device, which could be used to realize the three-dimensional motion decoupling for the proposed three-dimensional standard vibrator.

The operating processes of the present invention are as follows. Since the gas-floating decoupling devices are connected rigidly with the vibrator and the air spring by bolts, the vibration generated by one of the single-dimensional vibrator could be firstly transmitted to the gas-floating decoupling device, which is connected with the corresponding vibrator and the air spring, and then transmitted to the three-dimensional vibration platform by the uniform aerostatic gas films generated by the gas-floating decoupling devices along the corresponding axis. Since the proposed aerostatic gas films own the properties of good vibration transmission capabilities along the desired moving axis and small obstructions for the vibrations along the other two moving axes, they could be well satisfied with the requirements for motion decoupling. As a result, the output of the three-dimensional vibration platform is well decoupled, which could be regard as the combination of the three single-dimensional vibrations along X, Y, Z axes, respectively.

The advantages of the present invention are: 1) The gas films along X and Y axes are generated between the aerostatic gas-floating plates and the three-dimensional vibration platform, so they could cover large enough area. 2) For the vibrations along X and Y axes, the three-dimensional vibration platform is promoted alternately by the vibrator and the return mechanism corresponding to the desired moving axis. So, the load for the vibrator could be reduced. The aerostatic gas-floating plates are fixed with the vibrators or the return mechanisms with their whole surfaces contacting with each other, so there is no deformation trouble. 3) The porous-based aerostatic gas-floating decoupling device owns the properties of good vibration transmission capabilities along the desired moving axis and small interferences from the vibrations along the other two moving axes. So, it could be well used to realize the three-dimensional motion decoupling for the three-dimensional standard vibrator. Since the porous restrictor possesses much larger throttle area than the conventional orifice restrictor, it could supply larger load capacity and has a stable and uniform supporting property. As a result, the "pneumatic hammer" phenomenon and the tilt or rotate of the three-dimensional vibration platform for the conventional orifice restriction technique could be restrained by the proposed porous-based restriction technique.

DETAILED DESCRIPTION OF THE INVENTION

Hereinafter, further embodiments of the present invention will be described with reference to the accompanying drawings.

Embodiment 1

Figure 1:
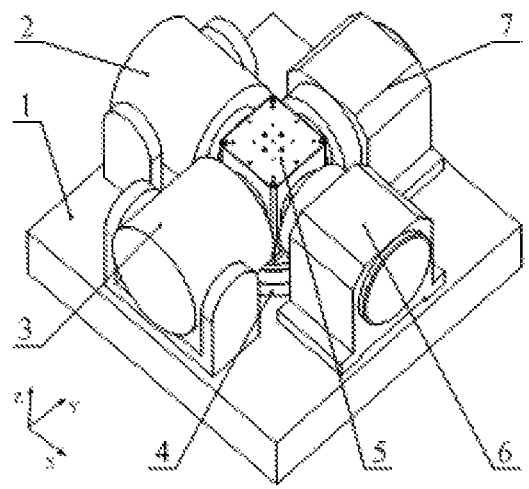
FIG. 1 is the schematic structure of the three-dimensional standard vibrator.

As shown in FIG. 1, the three-dimensional standard vibrator based on the aerostatic gas-floating decoupling device contains a base 1. The base 1 is installed with the X axis vibrator 2, the X axis return mechanism 6, the Y axis vibrator 3, the Y axis return mechanism 7, the Z axis vibrator 4, and the three-dimensional vibration platform 5. The X axis vibrator 2 and the X axis return mechanism 6 are used to realize the vibration of the three-dimensional vibration platform 5 along X axis; The Y axis vibrator 3 and the Y axis return mechanism 7 are used to realize the vibration of the three-dimensional vibration platform 5 along Y axis; The Z axis vibrator 4 is used to realize the vibration of the three-dimensional vibration platform 5 along Z axis.

Figure 2:
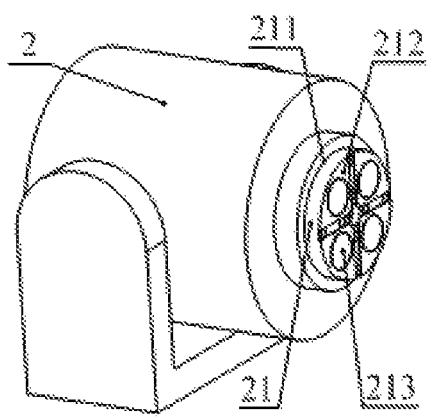
FIG. 2 is the connection diagram for the X axis vibrator.
Figure 3:
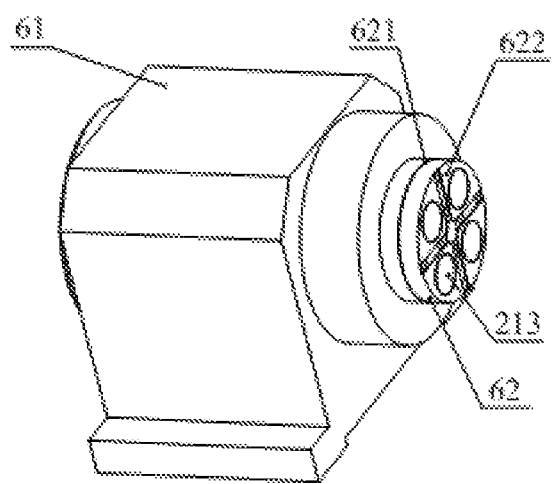
FIG. 3 is the connection diagram for the X axis return mechanism.

As shown in FIG. 2, the X axis vibrator 2 is connected with the aerostatic gas-floating plate 21 corresponding to the vibrator. As shown in FIG. 3, the X axis return mechanism 6 consists of the X axis air spring 61 and the aerostatic gas-floating plate 62 corresponding to the spring; Two gas films, which could be used to transmit the vibration along X axis, are formed between the X axis vibrator 2, the X axis return mechanism 6 and the three-dimensional vibration platform 5 through the aerostatic gas-floating plate 21 corresponding to the vibrator and the aerostatic gas-floating plate 62 corresponding to the spring, respectively.

The proposed aerostatic gas-floating plate 21 corresponding to the vibrator is a kind of slab structure, consisting of the first transmitting plane 211 and the second transmitting plane 212; The aerostatic gas-floating plate 21 corresponding to the vibrator is connected with the moving platform of the proposed X axis vibrator 2 by bolts. So, the vibration produced by the X axis vibrator 2 could be transmitted to the aerostatic gas-floating plate 21 corresponding to the vibrator. There is a small interval between the second transmitting plane 212 and the three-dimensional vibration platform 5, which could be used to generate gas film. Then, the vibration produced by the X axis vibrator 2 could be further transmitted to the three-dimensional vibration platform 5 by the gas film.

The porous restrictors 213 are fixed to the aerostatic gas-floating plate 21 corresponding to the vibrator when they are glued in the mounting holes, which are machined on the second transmitting plane 212. Accordingly, the gas channels, which are used to supply gas for the porous restrictors 213, are machined inside the aerostatic gas-floating plate 21 corresponding to the vibrator. When the outside pressured gas is supplied to the aerostatic gas-floating plate 21 corresponding to the vibrator, due to the restriction of the porous restrictors 213, a gas film, which could be used to realize the transmission of the vibration, is formed between the second transmitting plane 212 and the three-dimensional vibration platform 5.

The proposed aerostatic gas-floating plate 62 corresponding to the spring, which includes the third transmission plane 621 and the forth transmission plane 622, is designed the same as the aerostatic gas-floating plate 21 corresponding to the vibrator. The proposed aerostatic gas-floating plate 62 corresponding to the spring is connected with the X axis air spring 61 by bolts, so the reset forces produced by the X axis air spring 61 could be transmitted to the aerostatic gas-floating plate 62 corresponding to the spring. There is small interval between the forth transmitting plane 622 and the three-dimensional vibration platform 5, which could be used to generate gas film. Then, the reset forces produced by the X axis air spring 61 could be transmitted to the three-dimensional vibration platform 5 by the gas film.

The porous restrictors 213 are fixed to the aerostatic gas-floating plate 62 corresponding to the spring when they are glued in the mounting holes, which are machined on the forth transmitting plane 622. Accordingly, the gas channels, which are used to supply gas for the porous restrictors 213, are machined inside the aerostatic gas-floating plate 62 corresponding to the spring. When the outside pressured gas is supplied to the aerostatic gas-floating plate 62 corresponding to the spring, due to the restriction of the porous restrictors 213, a gas film, which could be used to realize the transmission of the vibration, is formed between the forth transmitting plane 622 and the three-dimensional vibration platform 5.

The proposed aerostatic gas-floating plates 21 and 62 corresponding to the vibrator and the spring together constitute the X axis gas-floating decoupling device.

Based on the vibration transmission of the uniform gas films generated by the X axis gas-floating decoupling device, the X axis vibrator 2 and the X axis air spring 61 together realize the transmission of the vibration generated by the X axis vibrator 2 as well as the vibration excitation for the three-dimensional vibration platform 5 along X axis.

The structure of the Y axis gas-floating decoupling device is the same as that of the X axis. The structure of Y axis vibrator 3 is the same as that of the X axis. The structure of Y axis air spring is the same as that the X axis. In the same way, based on the vibration transmission of the uniform gas films generated by the Y axis gas-floating decoupling device, the Y axis vibrator 3 and the Y axis air spring together realize the vibration excitation of the three-dimensional vibration platform 5 along Y axis.

Figure 4:
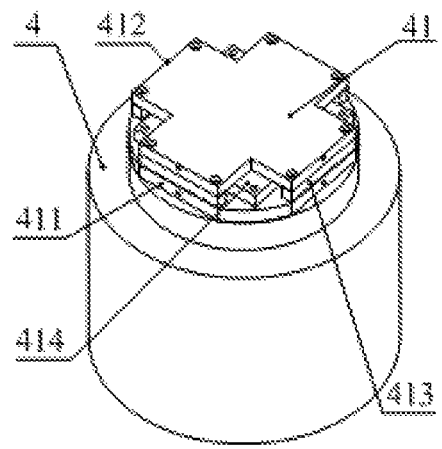
FIG. 4 is the connection diagram for the Z axis vibrator.

As shown in FIG. 4, the Z axis vibrator 4 is fixed with the Z axis gas-floating decoupling device 41. The Z axis gas-floating decoupling device consists of the first connecting plate 411, the second connecting plate 412, the adjusting plates 413 and the Z axis aerostatic gas-floating plate 414.

Figure 5:
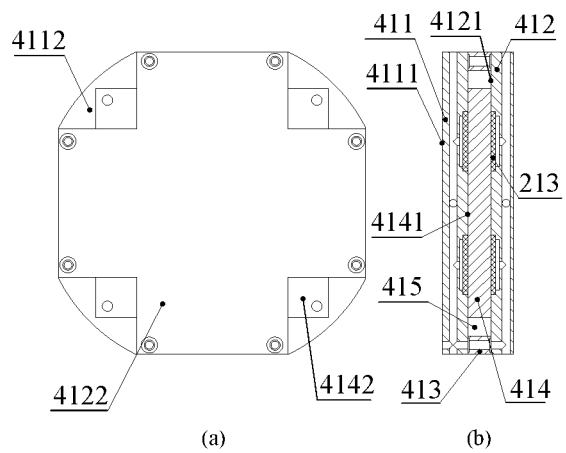
FIG. 5 is the structure diagram for the Z axis gas-floating decoupling device. (a) shows the front view of the Z axis gas-floating decoupling device; (b) shows the sectional view of (a) along A-A direction.

As shown in FIG. 5, the first connecting plate 411 consists of the first connecting plane 4111 and the second connecting plane 4112; The second connecting plate 412 consists of the third connecting plane 4121 and the forth connecting plane 4122; The proposed Z axis aerostatic gas-floating plate 414 consists of the first gas-floating plane 4141 and the second gas-floating plane 4142; The proposed first connecting plate 411 is connected with the Z axis vibrator 4 by bolts. Then, the vibration produced by the Z axis vibrator 4 could be transmitted to the first connecting plate 411. The first connecting plate 411, the adjusting plates 413 and the second connecting plate 412 are connected by bolts. Then, the second connecting plane 4112, the third connecting plane 4121 and the adjusting plates 413 together constitute the gas cavity 415. The Z axis aerostatic gas-floating plate 414 is installed in the proposed gas cavity 415. As a result, the first gas-floating plane 4141 corresponds to the second connecting plane 4112, and the second gas-floating plane 4142 corresponds to the third connecting plane 4121. A small interval could be formed between the second gas-floating plane 4142 and the third connecting plane 4121 by adjusting the size of the adjusting plates 413.

The porous restrictors 213 are fixed to the first connecting plate 411 and the second connecting plate 412 respectively when they are glued in the mounting holes, which are machined on the second connecting plane 4112 and the third connecting plane 4121, respectively. Accordingly, the gas channels, which are used to supply gas for the porous restrictors 213, are machined inside the first connecting plate 411 and the second connecting plate 412. When the outside pressured gas is supplied to the first connecting plate 411 and the second connecting plate 412, due to the restriction of the porous restrictors 213, two uniform gas films could be formed between the second connecting plane 4112 and the first gas-floating plane 4141 and between the third connecting plane 4121 and the second gas-floating plane 4142 since there is a small interval between the second gas-floating plane 4142 and the third connecting plane 4121.

Figure 6:
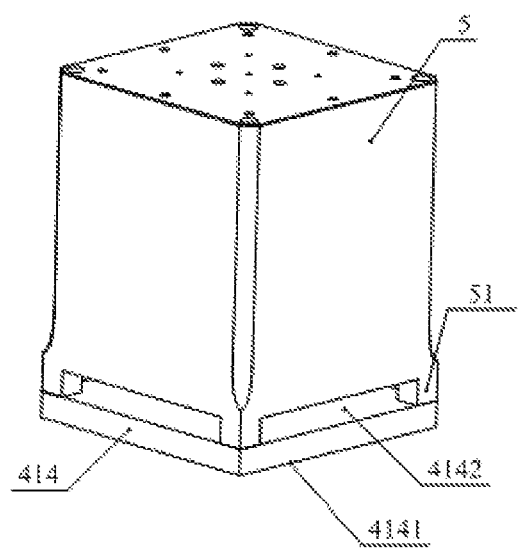
FIG. 6 is the installation diagram of the three-dimensional vibration platform.

As shown in FIG. 6, the proposed three-dimensional vibration platform 5 is installed with corner connecting posts 51, and the proposed second connecting plate 412 is machined with rectangular notches. Because of those two kinds of structures, the three-dimensional vibration platform 5 could be connected with the second connecting plane 4142 and keeps a gap from the forth connecting plane 4122. At the same time, as shown in FIG. 5, there are gaps between the Z axis aerostatic gas-floating plate 414 and the adjusting plates 413, too. All the gaps together are used to realize the freely vibrations of the three-dimensional vibration platform 5 along the X and Y axes.

With the efforts of the uniform gas films between the second connecting plane 4112 and the first gas-floating plane 4141 and between the third connecting plane 4121 and the second gas-floating plane 4142, the vibrations produced by the Z axis vibrator 4 could be further transmitted to the three-dimensional vibration platform 5 to realize the vibration excitation of the three-dimensional vibration platform 5 along Z axis.

The proposed X, Y, Z axis gas-floating decoupling devices together constitute the porous-based aerostatic gas-floating decoupling device, which could be used to realize the three-dimensional motion decoupling for the proposed three-dimensional standard vibrator.

The operating processes of the present invention are as follows. Since the gas-floating decoupling devices are connected rigidly with the vibrator and the air spring by bolts, the vibration generate by one of the single-dimensional vibrator could be firstly transmitted to the gas-floating decoupling device, which is connected with the corresponding vibrator and the air spring, and then transmitted to the three-dimensional vibration platform 5 by the uniform aerostatic gas films generated by the gas-floating decoupling devices along the corresponding axis. Since the proposed aerostatic gas films own the properties of good vibration transmission capabilities along the desired moving axis and small obstructions for the vibrations along the other two moving axes, they could be well satisfied with the requirements for motion decoupling. As a result, the output of the three-dimensional vibration platform 5 is well decoupled, which could be regard as the combination of the three single-dimensional vibrations along X, Y, Z axes, respectively.

The advantages of the present invention are: 1) The gas films along X and Y axes are generated between the aerostatic gas-floating plates and the three-dimensional vibration platform 5, so they could cover large enough area. 2) For the vibrations along X and Y axes, the three-dimensional vibration platform 5 is promoted alternately by the vibrator and the return mechanism corresponding to the desired moving axis. So, the load for the vibrator could be reduced. The aerostatic gas-floating plates are fixed with the vibrators or the return mechanisms with their whole surfaces contacting with each other, so there is no deformation troubles. 3) The porous-based aerostatic gas-floating decoupling device owns the properties of good vibration transmission capabilities along the desired moving axis and small interferences from the vibrations along the other two moving axes. So, it could be well used to realize the three-dimensional motion decoupling for the three-dimensional standard vibrator. Since the porous restrictor possesses much larger throttle area than the conventional orifice restrictor, it could supply larger load capacity and has a stable and uniform supporting property. As a result, the "pneumatic hammer" phenomenon and the tilt or rotate of the three-dimensional vibration platform 5 for the conventional orifice restriction technique could be restrained by the proposed porous-based restriction technique.

Embodiment 2

The differences between this embodiment and embodiment 1 are as follows. There is only one mounting hole in the aerostatic gas-floating plate 21 corresponding to the vibrator, the aerostatic gas-floating plate 62 corresponding to the spring, the first connecting plate 411 and the second connecting plate 412, respectively. Then, the restriction of the porous restrictor is realized when a whole piece of porous restrictor 213 is glued in the mounting hole.

The specific embodiments discussed are merely illustrative of specific ways to make and use the invention, and do not limit the scope of the invention. Meanwhile, it should be appreciated that various modifications and their equivalents can be devised by those skilled in the art and will fall within the spirit and scope of the principles of the disclosure.

What is claimed is:

1. A three-dimensional standard vibrator based on an aerostatic gas-floating decoupling device, the three-dimensional standard vibrator comprising a base having a X axis vibrator, a X axis return mechanism, a Y axis vibrator, a Y axis return mechanism, a Z axis vibrator, and a three-dimensional vibration platform, wherein:

the X axis vibrator is opposite to the X axis return mechanism device across the three-dimensional vibration platform;

the Y axis vibrator is opposite to the Y axis return mechanism device across the three-dimensional vibration platform;

wherein the X axis and Y axis return mechanisms both comprise a reset spring and an aerostatic gas-floating plate corresponding to the spring, wherein the reset springs are connected with the aerostatic gas-floating plate;

wherein the X axis vibrator and the Y axis vibrator are fixed with the aerostatic gas-floating plates on the X axis return mechanism and Y axis return mechanism, respectively; there is a gap between the aerostatic gas-floating plates on the X axis return mechanism and Y axis return mechanism and the three-dimensional vibration platform that can generate gas films;

wherein the Z axis vibrator is connected with a Z axis aerostatic gas-floating decoupling device, wherein there are intervals forming gas films between the Z axis aerostatic gas-floating decoupling device and the three-dimensional vibration platform;

wherein the Z axis gas-floating decoupling device consists of a first connecting plate, a second connecting plate, one or more adjusting plates and a Z axis aerostatic gas-floating plate;

wherein the adjusting plates are installed rigidly between the first and the second connecting plate, such that the adjusting plate and first and second connecting plates define a gas cavity where the Z axis aerostatic gas-floating plate is installed;

wherein notches are machined in the second connecting plate and connects the three-dimensional vibration platform with the Z axis aerostatic gas-floating plate, and the first and second connecting plates are both machined with gas flow channels and fixed with porous restrictors, and the gas flow channels lead to the porous restrictors for each of the connecting plates.

2. The three-dimensional standard vibrator according to claim 1, wherein the aerostatic gas-floating plates corresponding to the spring and the vibrator are installed symmetrically on both sides of the three-dimensional vibration platform.

3. The three-dimensional standard vibrator according to claim 2, wherein the X axis reset spring and Y axis reset spring are both air springs.

4. The three-dimensional standard vibrator according to claim 3, wherein the aerostatic gas-floating plates corresponding to the spring and the vibrator all comprise a base plate and some porous restrictors, wherein the porous restrictors are fixed on the base plate, and one or more gas channels in the base plate lead to the porous restrictors.

5. The three-dimensional standard vibrator according to claim 4, wherein there are a plurality of porous restrictors installed uniformly in the base plate.

* * * * *